(12) United States Patent
Kume et al.

(10) Patent No.: US 8,999,555 B2
(45) Date of Patent: Apr. 7, 2015

(54) BATTERY ARRAY CONFIGURED TO PREVENT VIBRATION

(75) Inventors: Masao Kume, Hirakata (JP); Toshiyuki Murakami, Otsu (JP)

(73) Assignee: Sanyo Electric Co., Ltd., Osaka (JP)

( * ) Notice: Subject to any disclaimer, the term of this patent is extended or adjusted under 35 U.S.C. 154(b) by 717 days.

(21) Appl. No.: 13/173,543

(22) Filed: Jun. 30, 2011

(65) Prior Publication Data

US 2012/0003526 A1     Jan. 5, 2012

(30) Foreign Application Priority Data

Jun. 30, 2010   (JP) .................. 2010-150568

(51) Int. Cl.
| | |
|---|---|
| H01M 6/42 | (2006.01) |
| H01M 6/46 | (2006.01) |
| H01M 2/10 | (2006.01) |
| H01M 2/02 | (2006.01) |
| H01M 10/04 | (2006.01) |
| H01M 10/44 | (2006.01) |
| H01M 10/613 | (2014.01) |
| H01M 10/6557 | (2014.01) |
| H01M 10/625 | (2014.01) |
| H01M 10/627 | (2014.01) |

(Continued)

(52) U.S. Cl.
CPC ........ *H01M 2/1077* (2013.01); *H01M 2220/20* (2013.01); *H01M 2/0262* (2013.01); *H01M 2/028* (2013.01); *H01M 10/0481* (2013.01); *H01M 10/441* (2013.01); *H01M 10/5004* (2013.01); *H01M 10/5016* (2013.01); *H01M 10/5018* (2013.01); *H01M 10/5032* (2013.01); *H01M 10/5059* (2013.01); *H01M 10/5067* (2013.01)

(58) Field of Classification Search
CPC .................................................... H01M 2/1077
USPC .......................................... 429/151, 152, 156
See application file for complete search history.

(56) References Cited

U.S. PATENT DOCUMENTS

| | | | |
|---|---|---|---|
| 2010/0119931 A1 | 5/2010 | Shishido et al. | |
| 2010/0167115 A1* | 7/2010 | Okada et al. ................. | 429/99 |
| 2011/0244298 A1 | 10/2011 | Guener et al. | |

FOREIGN PATENT DOCUMENTS

| | | |
|---|---|---|
| DE | 10 2008 057 210 | 5/2010 |
| DE | 10 2008 059 949 | 6/2010 |
| EP | 2 339 663 | 6/2011 |

(Continued)

OTHER PUBLICATIONS

Machine translation of JP 2010-086887, Kakuchi et al., Apr. 15, 2010.*

(Continued)

*Primary Examiner* — Edu E Enin-Okut
(74) *Attorney, Agent, or Firm* — Wenderoth, Lind & Ponack, LLP (57) ABSTRACT

A battery array is provided with a battery stack (5) having a plurality of rectangular battery cells (1) stacked together with intervening separators (2), endplates (3) disposed at the ends of the battery stack, and binding bars (4) extending in the battery cell stacking direction and attached to the endplates in a manner that binds both sides of the battery stack. The binding bars are configured as plates of given width extending along the battery stack surfaces. The binding bars and separators fit together in a linked configuration that limits their relative movement in the up-and-down direction.

13 Claims, 12 Drawing Sheets

(51) Int. Cl.
    *H01M 10/647*    (2014.01)
    *H01M 10/6563*   (2014.01)

(56) References Cited

FOREIGN PATENT DOCUMENTS

| JP | 2001-210293 | 8/2001 |
| JP | 2008-269985 | 11/2008 |
| JP | 2008-277085 | 11/2008 |
| JP | 2010-86887  | 4/2010 |

OTHER PUBLICATIONS

European Search Report (in English language) issued Oct. 17, 2011 in corresponding to European Patent Application No. 11 00 5219.

* cited by examiner

BATTERY ARRAY CONFIGURED TO PREVENT VIBRATION

BACKGROUND OF THE INVENTION

1. Field of the Invention

The present invention relates to a battery array having a plurality of rectangular battery cells stacked with intervening separators, and in particular to a battery array optimally suited as a power source installed on-board an electric-powered vehicle such as a hybrid vehicle (hybrid car) or electric vehicle (electric automobile) to supply power to a motor that drives the vehicle.

2. Description of the Related Art

A battery array for automotive applications has many battery cells connected in series to increase output voltage and power. Considering charging capacity per unit volume, a battery array has been developed that arranges many rectangular battery cells in a stack.

For example, refer to Japanese Laid-Open Patent Publication 2010-86887.

In the battery array cited in JP 2010-86887, angled binding bars are attached to retain the rectangular battery cells in a stack. The ends of the binding bars are attached to endplates disposed at each end of the rectangular battery cell stack.

With this battery array, it is difficult to reliably prevent up-and-down vibration of the rectangular battery cells held between the binding bars. In particular, when used in a vibration inducing environment such as in a vehicle, rectangular battery cell vibration cannot be reliably prevented. Specifically, when a battery array with many rectangular battery cells stacked between intervening separators is installed in a vibration inducing environment, rectangular battery cells disposed in the center region vibrate up-and-down. In this situation, vibration of the centrally located rectangular battery leads to various detrimental effects. For example, insulating layers established on the surfaces of vibrating rectangular battery cells can rub against non-vibrating binding bars to cause leakage currents or insulation breakdown. In addition, vibration can physically damage individual rectangular battery cells and result in detrimental effects such as degraded electrical characteristic or reduced lifetime.

Rectangular battery cell vibration can be reduced by tightening the binding bars to apply more pressure on the battery stack. However, with this structure, not only is it difficult to reliably prevent vibration by tightening the binding bars, but other detrimental effects are generated by applying excessive pressure on the rectangular battery cells. For example, damaging effects such as separator distortion, which can prohibit stable battery cell cooling, or rectangular battery cell distortion, can result.

The present invention was developed with the object of avoiding the detrimental effects described above. Thus, it is a primary object of the present invention to provide a battery array that prevents rectangular battery cell vibration with an extremely simple structure and can effectively avert various detrimental effects caused by vibration.

SUMMARY OF THE INVENTION

The battery array of the present invention is provided with a battery stack 5 having a plurality of rectangular battery cells 1 stacked together with intervening separators 2, endplates 3 disposed at the ends of the battery stack 5, and binding bars 4 extending in the battery cell 1 stacking direction and attached to the endplates 3 in a manner that binds both sides of the battery stack 5. The binding bars 4 are configured as plates of given width extending along the battery stack 5 surfaces. The binding bars 4 and separators 2 fit together in a linked configuration that limits their relative movement in the up-and-down direction. In this application, the up-and-down direction means directions parallel to the side surfaces of the battery stack positioned at the binding bar surfaces, and parallel to the rectangular battery cells that contact the primary surfaces of the separators.

The battery array described above is characterized by preventing rectangular battery cell vibration with an extremely simple structure, and by effectively averting various detrimental effects due to vibration. This is because of the robust inner surface bending strength of the plate-shaped binding bars that extend along the surfaces of the battery stack. Specifically, the binding bars have high bending strength in the up-and-down direction. Furthermore, the binding bars fit together in a linked configuration with the separators to avoid up-and-down movement. The separators, which are linked to the binding bars in a manner that avoids up-and-down movement, are prevented from vibrating up-and-down by the binding bars. Since both primary surfaces of the rectangular battery cells are sandwiched between separators, rectangular battery cell vibration can be prevented by preventing up-and-down vibration of the separators between the rectangular battery cells. In particular, since there is no relative up-and-down vibration between the binding bars and separators, relative vibration is reliably prevented between the binding bars and the rectangular battery cells sandwiched between the separators. Accordingly, damage resulting from friction between the rectangular battery cells and the binding bars can be reliably prevented. In addition, since rectangular battery cell vibration is prevented, detrimental effects to individual rectangular battery cells (such as internal battery cell damage) can also be reliably prevented.

In the battery array of the present invention, the separators 2 can have insertion grooves 24 that fit with the binding bars 4, and the binding bars 4 can be inserted in the insertion grooves 24. In this battery array, relative vibration between the separators and the binding bars can be prevented by inserting the binding bars in the separator insertion grooves. As a result, rectangular battery cell vibration can be effectively prevented while enabling simple battery array assembly.

In the battery array of the present invention, the separators 2 can have insertion grooves 24 at the top or bottom on both sides, binding bars 4 can have an L-shaped cross-section configured with a vertical section 41 that aligns with the sides of the battery stack 5 and a horizontal section 42 that fits in the insertion grooves 24, and the horizontal sections 42 can be inserted in the insertion grooves 24. In this battery array, since the horizontal sections of the L-shaped binding bars are inserted in separator insertion grooves, the binding bars and separators become reliably linked in a structure with no relative vibration between its elements. In addition, the vertical and horizontal bending strength of the binding bars is increased to achieve the characteristic that the battery stack can be robustly held together with the binding bars.

In the battery array of the present invention, binding bars 4 can be disposed at the top and bottom on both sides of the battery stack 5. In this battery array, since both sides of the battery stack are held together at the top and bottom by binding bars, the plurality of stacked rectangular battery cells can be held together more robustly and rectangular battery cell vibration can be prevented more effectively.

In the battery array of the present invention, each rectangular battery cell 1 can be provided with a metal external case 11, and the surface of the metal external case 11 can be covered with an insulating layer 16. This battery array is characterized by insulating the metal external case of each rectangular battery cell with an insulating layer and effectively preventing damage to the insulating layer caused by rubbing against the binding bars to reliably prevent leakage current and insulation breakdown.

In the battery array of the present invention, the tops and bottoms of the separators 2 can have projecting pieces 23 that fit rectangular battery cells 1 inside, and the rectangular battery cells 1 can be disposed inside the upper and lower projecting pieces 23. In this battery array, since the separators and rectangular battery cells join in a manner that has no up-and-down movement, relative up-and-down motion can be reliably prevented between the rectangular battery cells and both sides of the separators. Consequently, this battery array has the characteristic that up-and-down vibration of the rectangular battery cells can be prevented in an ideal manner.

In the battery array of the present invention, the tops and bottoms of the separators 2 can have projecting pieces 23 that fit rectangular battery cells 1 inside, the rectangular battery cells 1 can be disposed inside the upper and lower projecting pieces 23, and insertion grooves 24 that mate with the binding bars 4 can be provided in the projecting pieces 23. In addition to preventing up-and-down vibration of the rectangular battery cells in an extremely effective manner, this battery array can dispose horizontal sections of the binding bars in upper and lower positions that do not interfere with the rectangular battery cells. As a result, horizontal sections of the binding bars can be made wider, binding bars and separators can be reliably connected, and binding bar bending strength can be increased via the horizontal sections allowing the rectangular battery cells to be tightly held in the stacked configuration. The above and further objects of the present invention as well as the features thereof will become more apparent from the following detailed description to be made in conjunction with the accompanying drawings.

DETAILED DESCRIPTION OF THE EMBODIMENTS

The following describes embodiments of the present invention based on the figures.

As an embodiment of the present invention, the following describes an example of battery arrays used in a power source apparatus installed on-board a vehicle to supply power to a motor that drives the vehicle. The following description is based on FIGS. 1-7.

Figure 1:
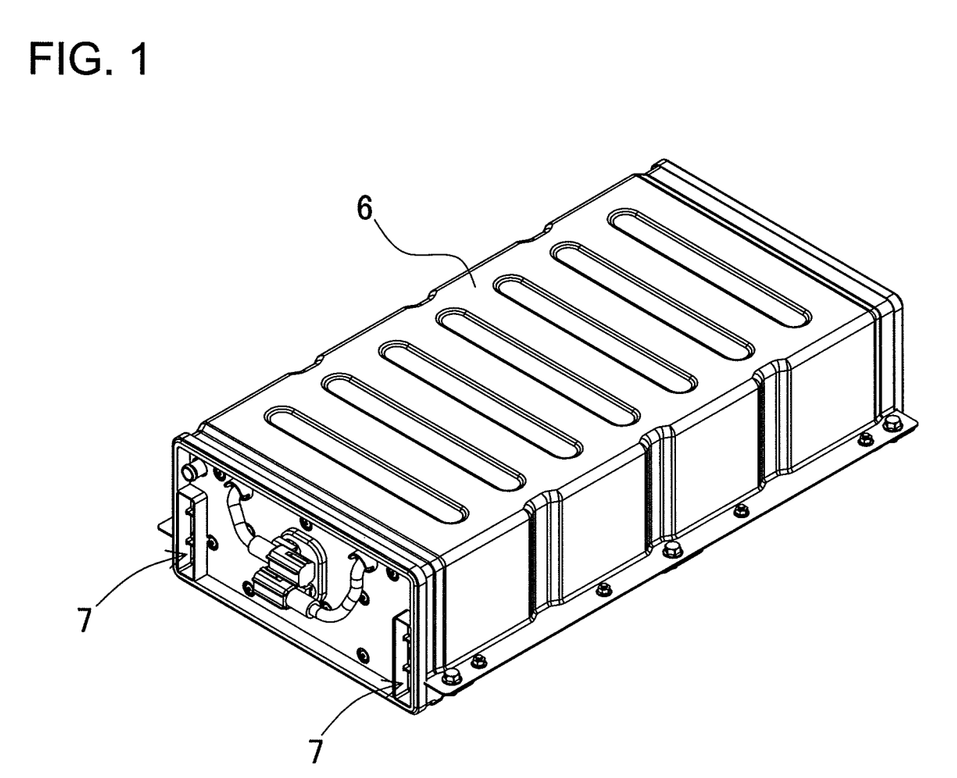
FIG. 1 is a perspective view of the exterior of a power source apparatus using a battery array for an embodiment of the present invention.
Figure 2:
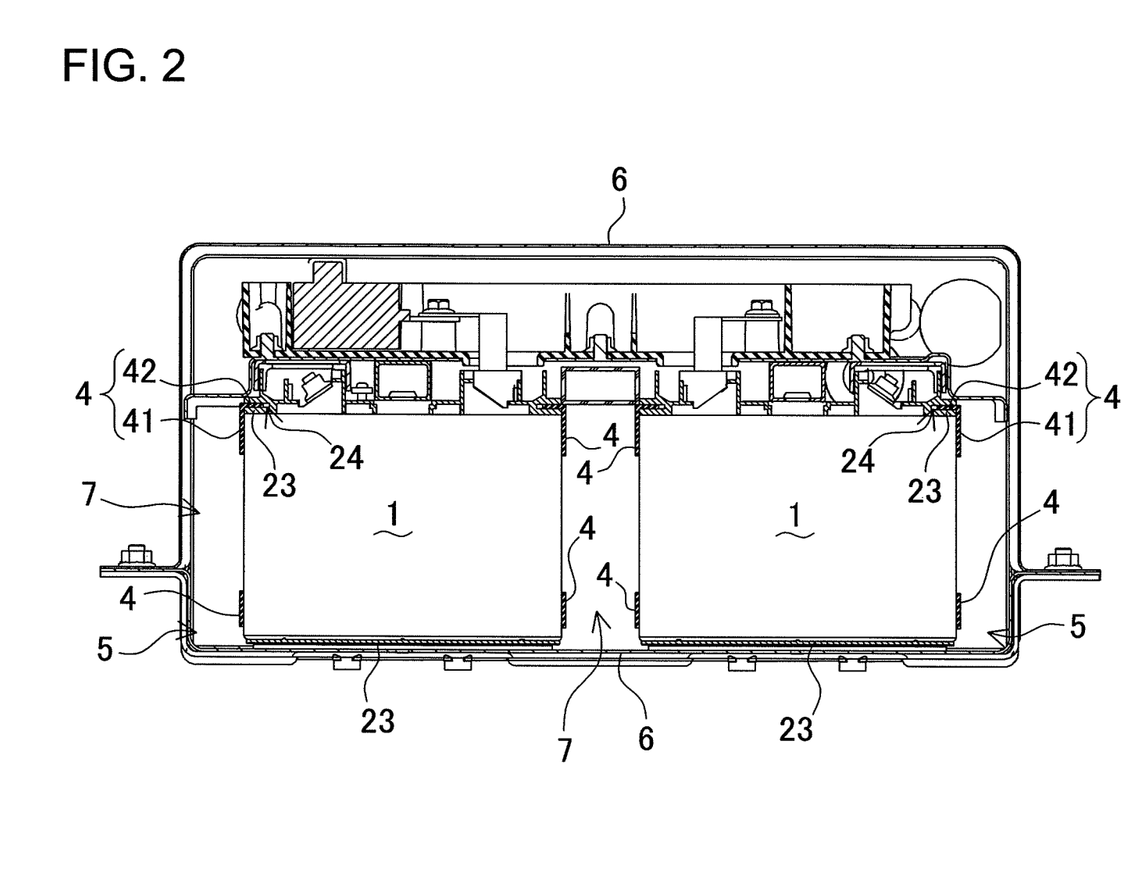
FIG. 2 is a vertical cross-sectional view through the power source apparatus shown in FIG. 1.
Figure 3:
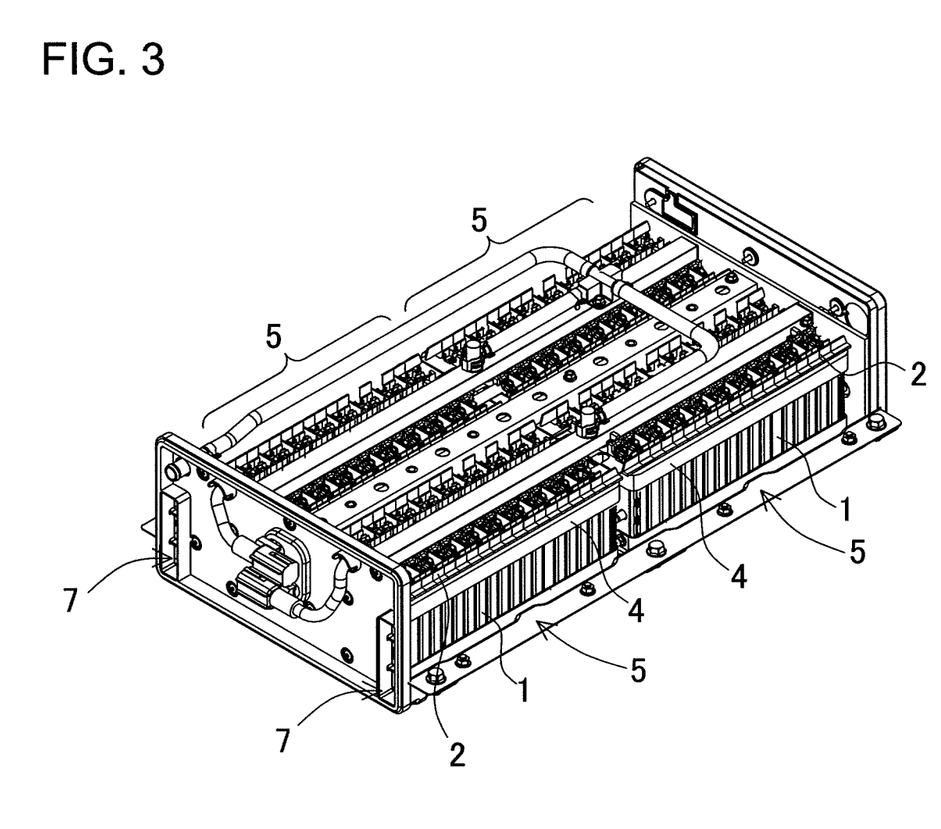
FIG. 3 is a perspective view showing the power source apparatus in FIG. 1 with the outer case removed.

Battery arrays are housed in an outer case 6 and installed as a power source apparatus in a vehicle. Cooling ducts 7 are established between the battery arrays and the outer case 6 to cool rectangular battery cells 1 in the battery arrays. Forced ventilation cools the rectangular battery cells 1 by introducing cooling gas into the cooling ducts 7 and between the separators 2 and rectangular battery cells 1.

Figure 4:
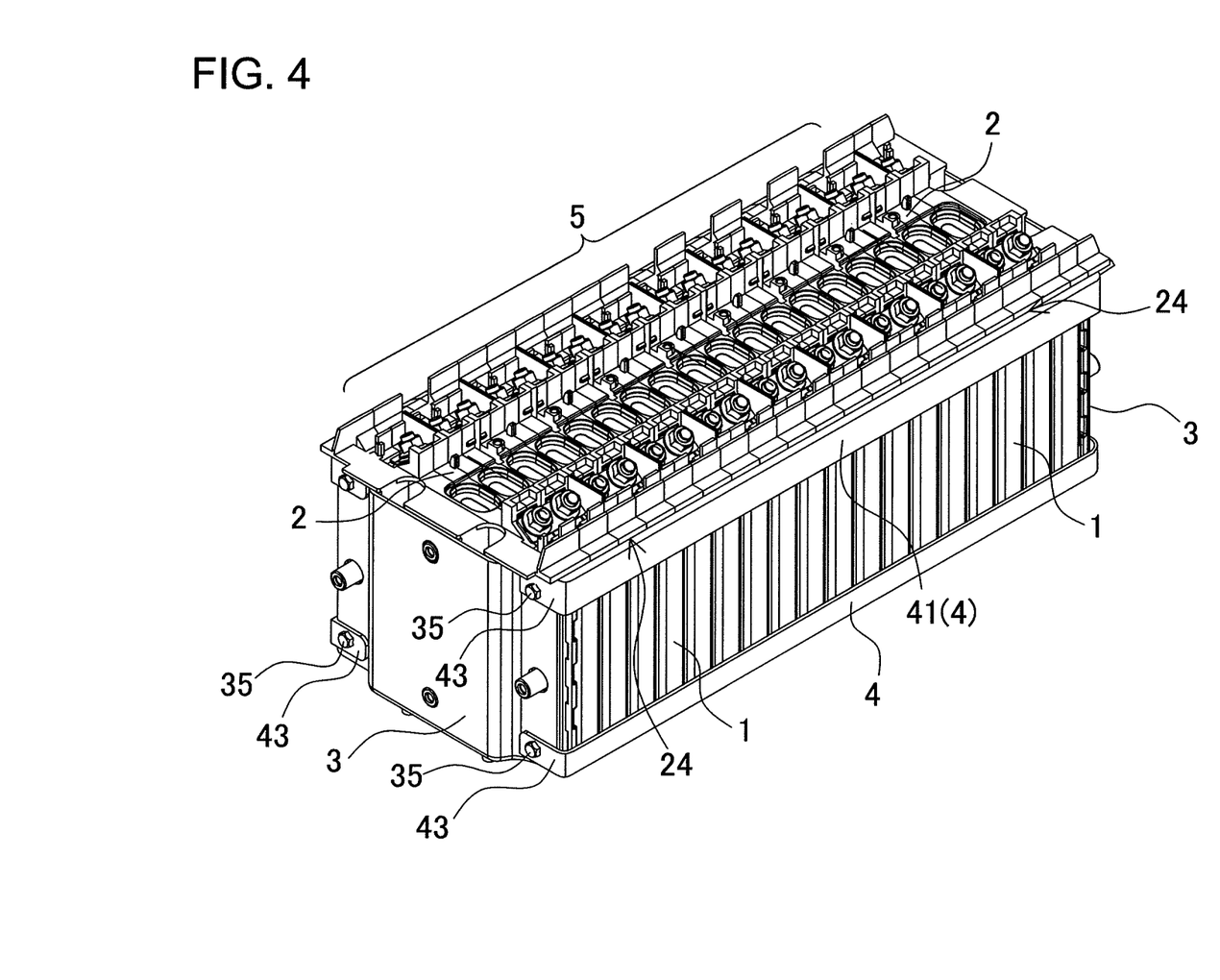
FIG. 4 is a perspective view of a battery array for an embodiment of the present invention.
Figure 5:
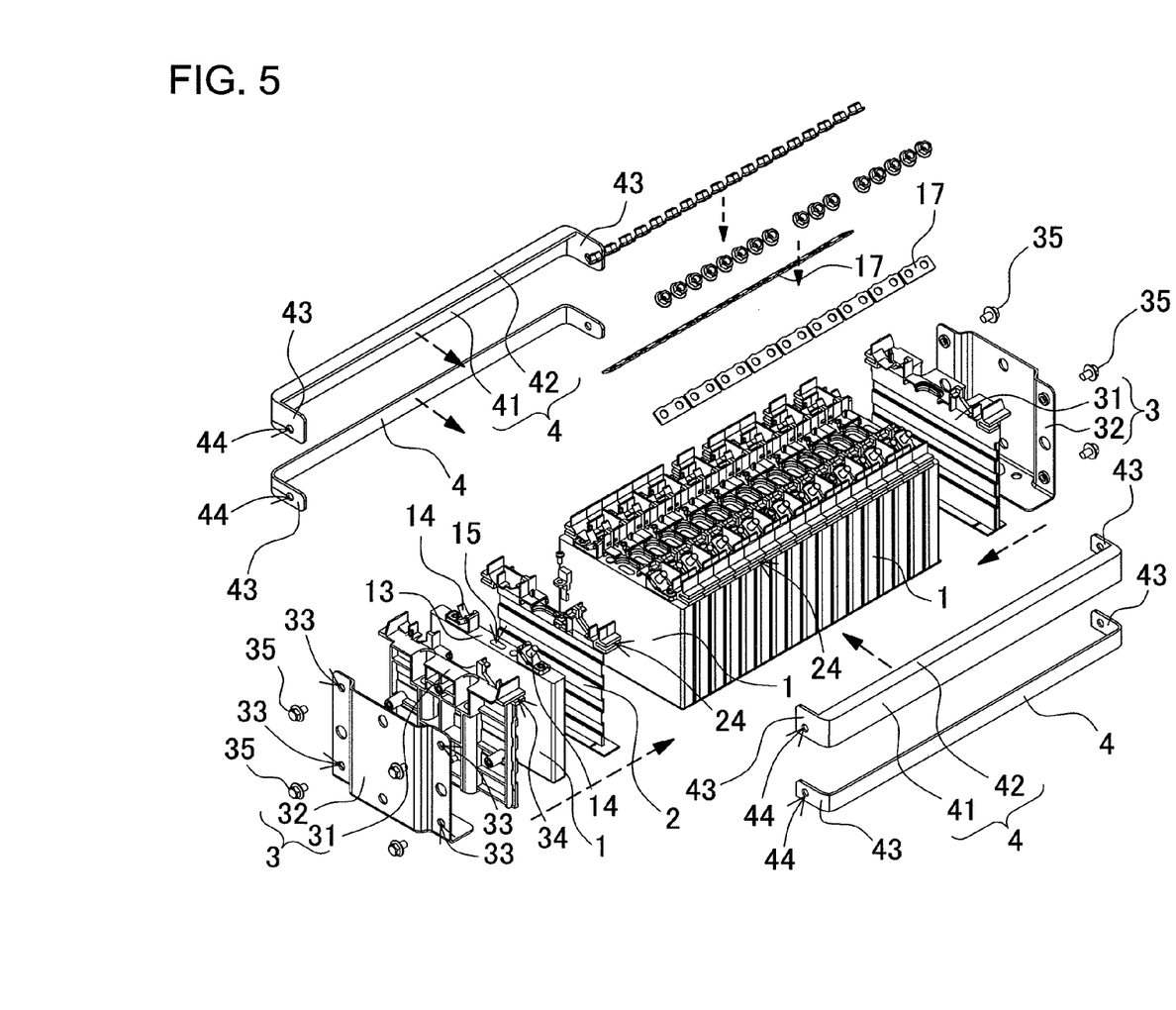
FIG. 5 is an exploded perspective view of the battery array shown in FIG. 4.
Figure 6:
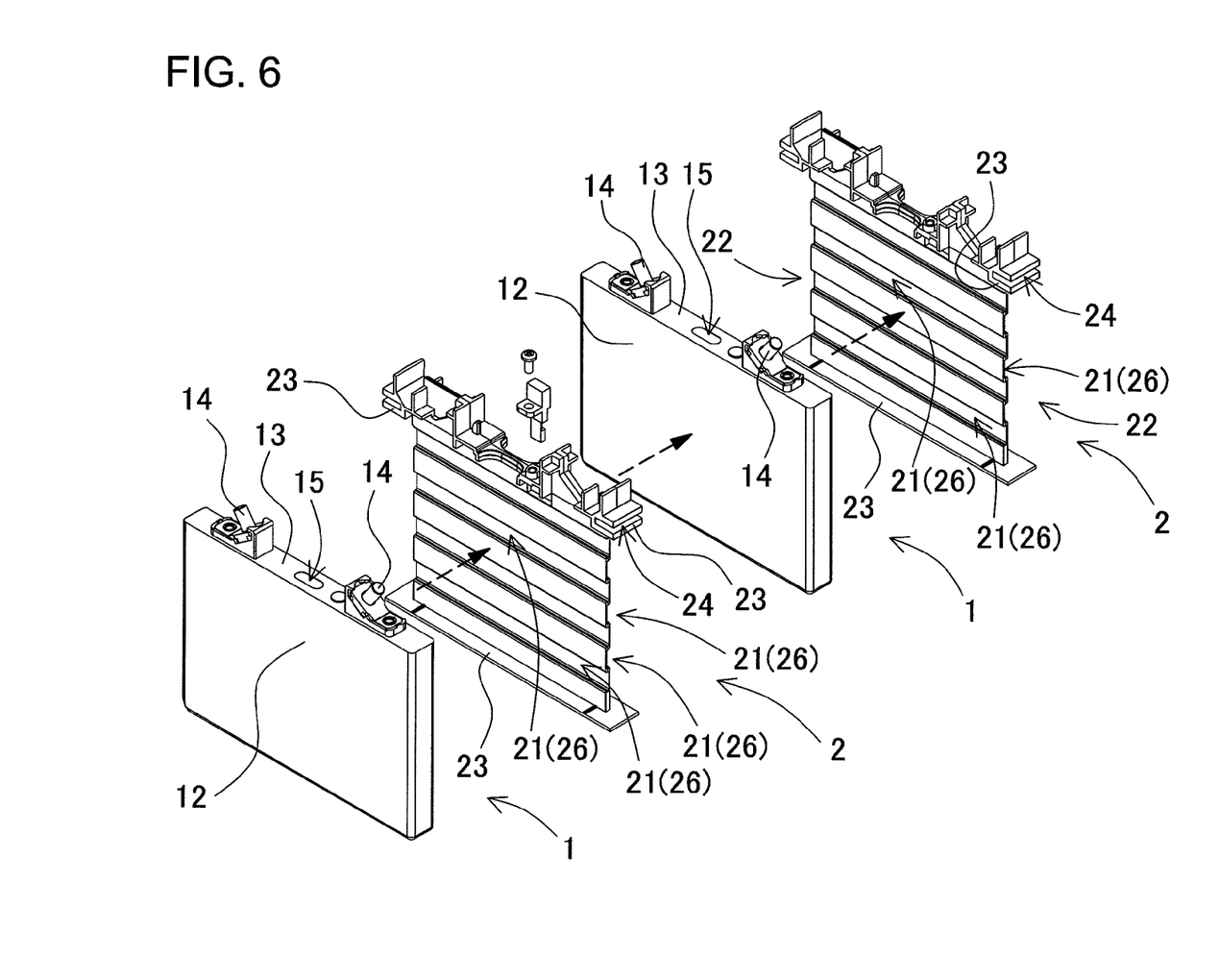
FIG. 6 is an exploded perspective view showing the stacking configuration for the rectangular battery cells and separators that make up the battery array shown in FIG. 4.

As shown in FIGS. 4-6, a battery array is made up of a battery stack 5 having of a plurality of rectangular battery cells 1 stacked together with intervening separators 2. Separators 2 act as spacers that form cooling gaps 26 between adjacent rectangular battery cells 1. Cooling gas is forced to flow through the cooling gaps 26 by a forced ventilating unit (not illustrated), and the rectangular battery cells 1 are cooled by the flow cooling gas. Further, a number of the plurality of rectangular battery cells 1 are thermally connected to temperature sensors (not illustrated), and the temperature of the entire battery array is estimated from rectangular battery cell 1 temperature detected by the temperature sensors. Detection signals from the temperature sensors are sent to a temperature control circuit (not illustrated) and interpreted as temperature data by the temperature control circuit. At the temperature control circuit-side, essential temperature control is performed. For example, the speed of the driving motor in the forced ventilating unit fan is adjusted, or charging and discharging currents in the charging and discharging circuits are limited.

[Battery Array]

As shown in FIGS. 4-6, a battery array has a plurality of rectangular battery cells 1 stacked with intervening insulating separators 2 and a pair of endplates 3 disposed at the ends of the battery stack 5. The pair of endplates 3 is connected by binding bars 4 to hold the rectangular battery cells 1 in the battery stack 5.

[Rectangular Battery Cells 1]

Each rectangular battery cell 1 utilizes a thin-outline external casing 12 with a thickness that is narrower than the lateral width of the top of the battery cell. The external casing 12 is approximately box-shaped with curved lateral edges that have four beveled corners as viewed from the top or bottom. Battery cells with this shape are referred to as rectangular batteries in contrast with circular cylindrical batteries. In addition, a sealing plate 13 that seals-closed the top of external casing 12 is provided with protruding positive and negative electrode terminals 14 and a safety valve 15 disposed between the pair of electrode terminals 14. The safety valve 15 is configured to open and discharge gas inside if the pressure in the external casing 12 builds beyond a given value. By opening the safety valve 15, rise in pressure inside the external casing 12 can be stopped.

A unit cell that makes up a rectangular battery cell 1 is a rechargeable battery such as a lithium ion battery, nickel hydride battery, or nickel cadmium battery. In particular, when lithium ion batteries are used as the rectangular battery cells 1, the overall battery array has the characteristic that charging capacity can be increased per unit volume and per unit mass.

A rectangular battery cell 1 as shown in FIG. 6 has a rectangular shape of given thickness, has positive and negative electrode terminals 14 that protrude from the ends of the upper surface, and has an opening for the safety valve 15 at the center of the upper surface. Adjacent positive and negative electrode terminals 14 of the stacked rectangular battery cells 1 are connected together via bus-bars 17 for series connection. A power source apparatus with adjacent battery cells 1 connected in series can achieve high output voltage and power. However, the power source apparatus can also be connected with adjacent battery cells in parallel.

Figure 7:
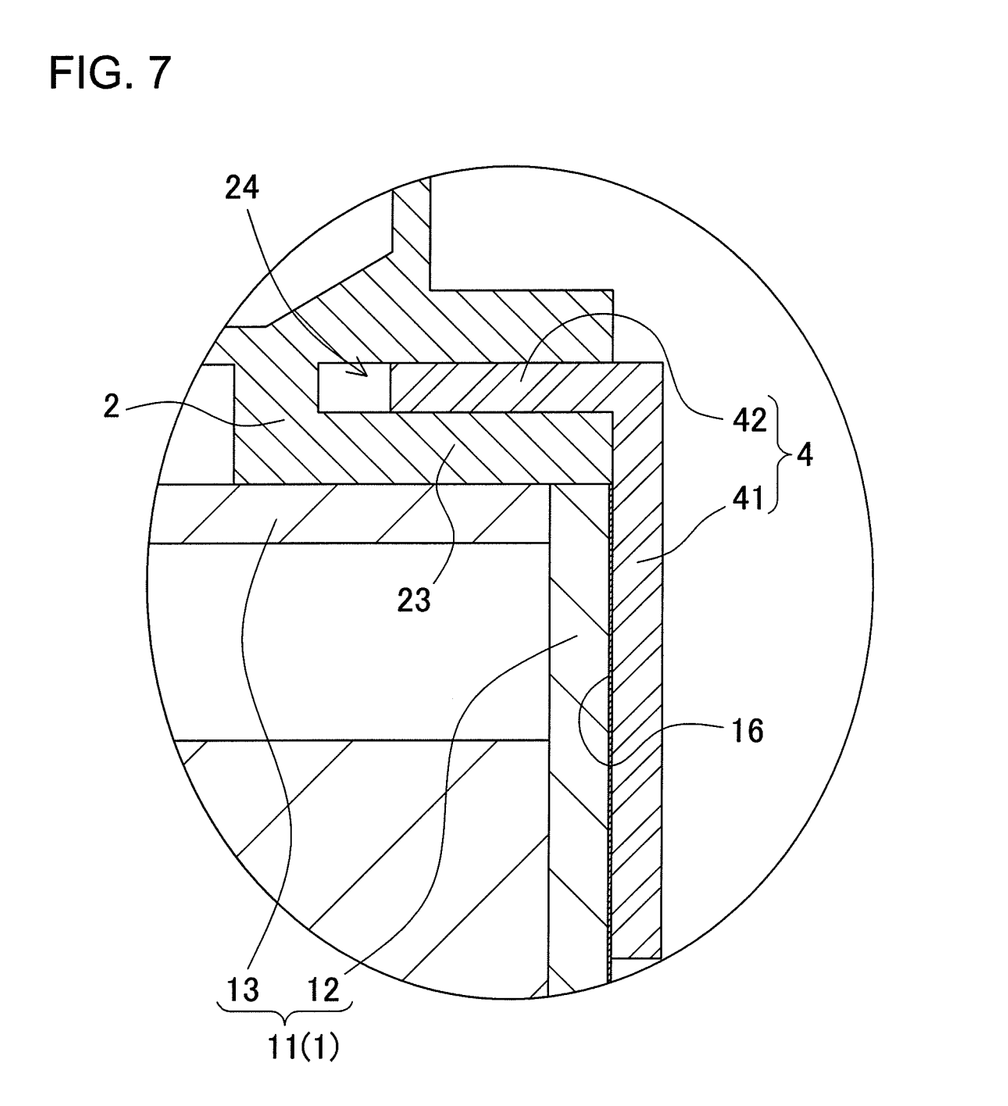
FIG. 7 is an enlarged vertical cross-sectional view through an important part of the battery array shown in FIG. 4.

The exterior of the rectangular battery cell 1 in FIG. 7 is a metal external case 11 made up of an external casing 12 and a sealing plate 13, and the metal external case 11 is covered by an insulating layer 16. The insulating layer 16 is heat-shrink tubing. A heat-shrink insulating layer 16 is formed by inserting the rectangular battery cell 1 in the sleeve of the heat-shrink tubing and heating. This tightly attaches the heat-shrink tubing and insulates the surface of the rectangular battery cell 1. However, instead of heat-shrink tubing, insulating film or insulating coating can also be used for the insulating layer 16. The surface of the metal external case 11 of each rectangular battery cell 1 is insulated by an insulating layer 16, and short circuit is prevented between the external casing 12 and the metal-plate binding bars 4. A rectangular battery 1 with no connection between the metal external case 11 and the positive or negative output terminals has a potential on the external casing 12. If this rectangular battery 1 contacts a metal-plate binding bar 4, short circuit current will flow. The insulating layer 16 prevents rectangular battery 1 contact with the binding bars 4 and prevents short circuit current flow.

Further, insulating separators 2 are sandwiched between adjacent rectangular battery cells 1 to prevent short circuit between the metal external cases 11. Note, external casings of the rectangular battery cells can also be made of insulating material such as plastic. In that case, since there is no need to insulate the external casings in the stack of rectangular battery cells, the separators can be made of metal.

[Separators 2]

Separators 2 are spacers stacked with the rectangular battery cells 1 to electrically and thermally insulate adjacent battery cells. Separators 2 are made of insulating material such as plastic to insulate adjacent rectangular battery cells 1. As shown in FIG. 6, separators 2 establish cooling gaps 26 to pass cooling gas such as air between the separators 2 and rectangular battery cells 1 to cool the battery cells. The separators 2 in FIG. 6 are provided with grooves 21 that extend to the edges on both sides of the surfaces opposite the rectangular battery cells 1 and establish cooling gaps 26 between the battery cells and the separators 2. The separators 2 of the figures are provided with a plurality of parallel grooves 21 separated by a given spacing. The separators 2 of the figures have grooves 21 provided on both sides to establish cooling gaps 26 between the separators 2 and adjacent rectangular battery cells 1 on both sides. This structure has the characteristic that rectangular battery cells 1 on both sides of a separator 2 can be cooled effectively. However, separators can also be configured with grooves provided on only one side to establish cooling gaps between the separators and rectangular battery cells. The cooling gaps 26 of the figures are established in a horizontal orientation with openings on the left and right sides of the battery stack 5. In addition, the separators 2 of the figures are provided with cut-outs 22 on both sides. The cut-outs 22 in the separators 2 create a wide gap between opposing surfaces of adjacent rectangular battery cells 1 allowing resistance to the cooling gas flow to be reduced. This allows cooling gas to flow smoothly from the cut-outs 22 into the cooling gaps 26 between the separators 2 and the rectangular battery cells 1 and effectively cool the rectangular battery cells 1. As a result, cooling gas such as air, which is forcibly ventilated into the cooling gaps 26, directly and efficiently cools rectangular battery cell 1 external casings 12. Consequently, this structure has the characteristic that rectangular battery cells 1 can be efficiently cooled while effectively preventing battery cell thermal run-away.

As shown in FIGS. 5 and 6, the separators 2 are provided with projecting pieces 23 at the top and bottom on both sides to mate in a fit-together structure with rectangular battery cells 1 on both sides. Rectangular battery cells 1 are inserted inside and disposed between the upper and lower projecting pieces 23. The upper and lower projecting pieces 23 are positioned along the top and bottom surfaces of the rectangular battery cells 1 and sandwich each rectangular battery cell 1 from above and below to hold it in a fixed position.

The projecting piece 23 disposed at the bottom of a rectangular battery cell 1 extends along the long (lateral) dimension of the separator 2 and is established along the entire bottom edge of the separator 2. The projecting piece 23 disposed at the top of a rectangular battery cell 1 is established only at the ends of the top of the separator 2. When the separators 2 are stacked with rectangular battery cells 1, the upper projecting pieces 23 allow rectangular battery cell 1 electrode terminals 14 to be exposed outside.

As shown in FIGS. 5-7, projecting pieces 23 disposed at the tops of the rectangular battery cells 1 are provided with insertion grooves 24 that mate with the binding bars 4. Insertion grooves 24 provided in the upper projecting pieces 23 are shaped to allow insertion of the horizontal sections 42 of the binding bars 4, which extend in the rectangular battery cell 1 stacking direction. Although the separator 2 insertion grooves 24 in the figures are established on the upper projecting pieces 23, insertion grooves can be established on the lower projecting pieces instead. Further, insertion grooves can also be established on both the upper and lower projecting pieces.

Figure 8:
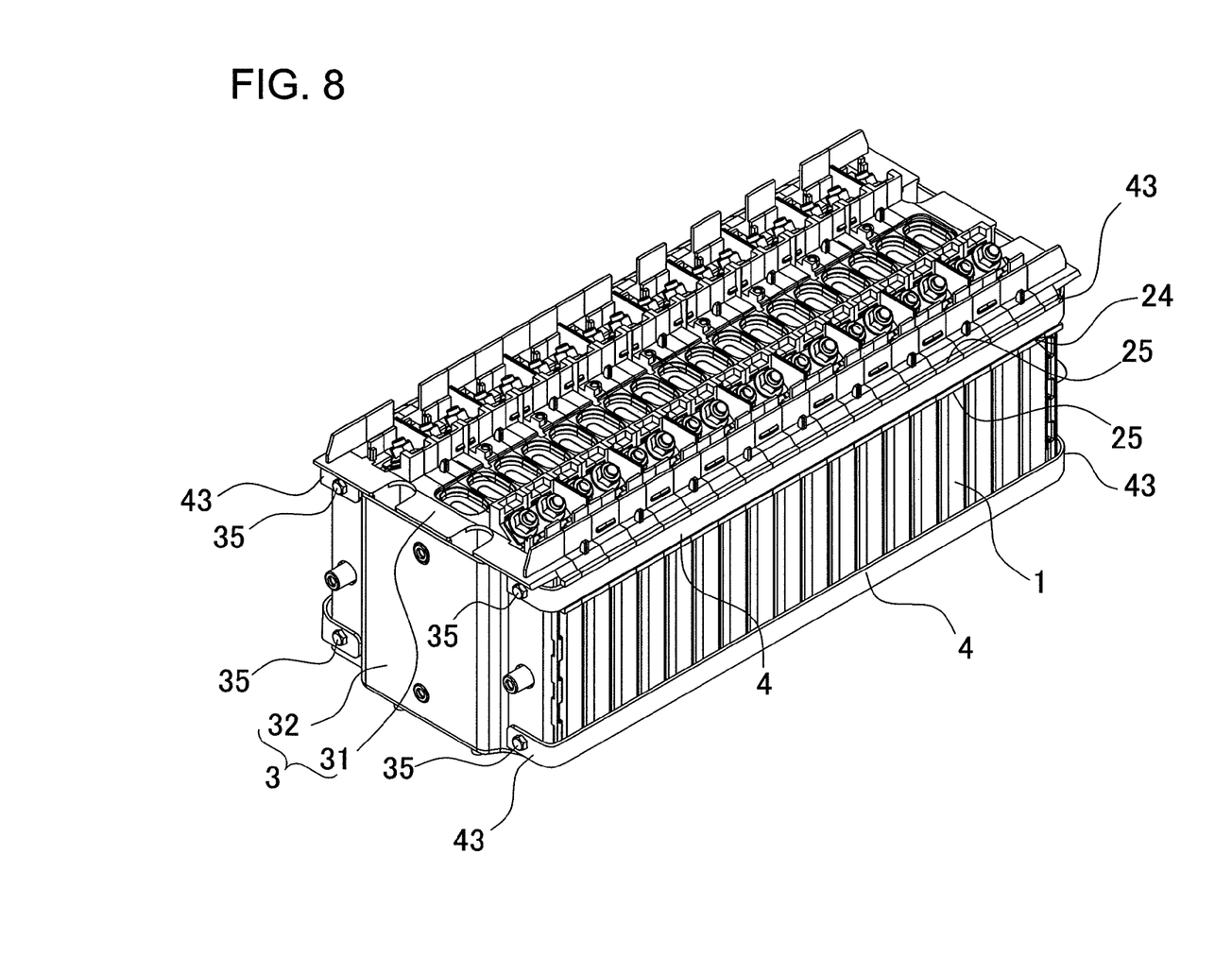
FIG. 8 is a perspective view of a battery array for another embodiment of the present invention.
Figure 9:
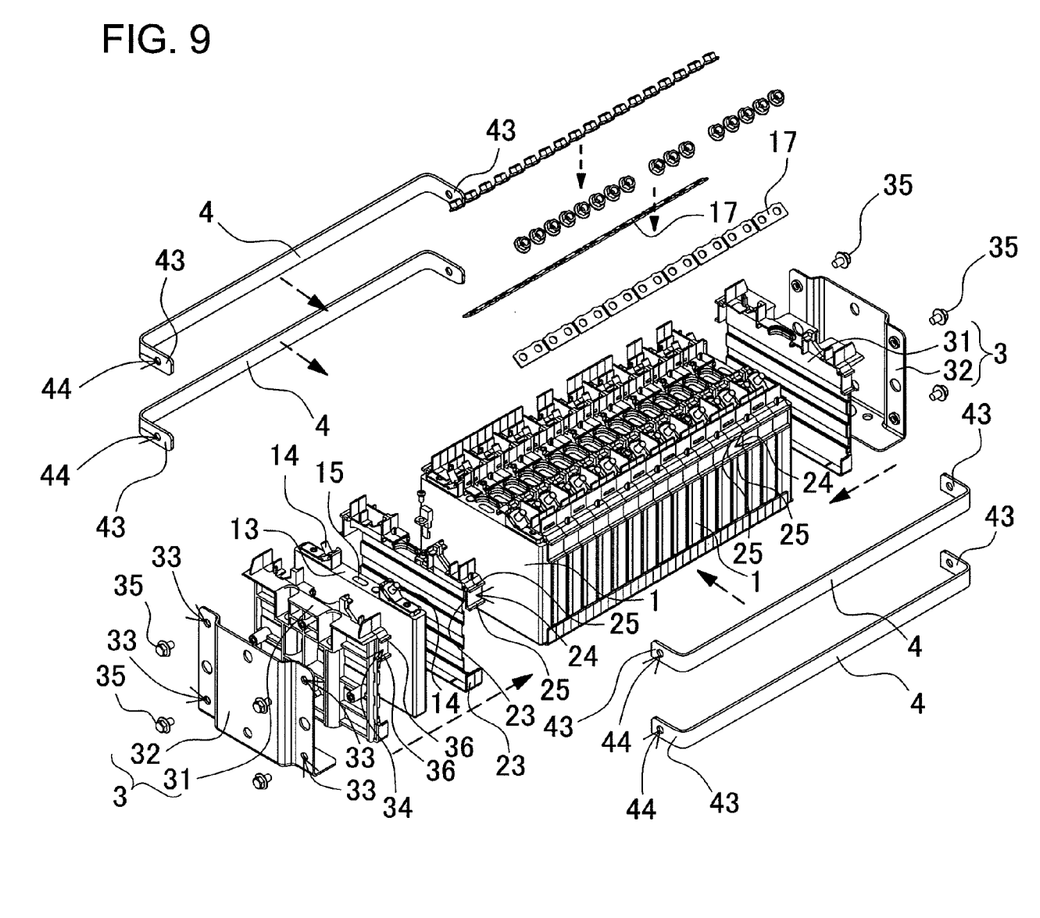
FIG. 9 is an exploded perspective view of the battery array shown in FIG. 8.

Insertion grooves 24 are provided in the projecting pieces 23 of the separators 2 shown in FIGS. 4-7. However, as shown in FIGS. 8 and 9, separators 2 can also be provided with pairs of guide projections 25 positioned above and below the plate-shaped binding bars 4. The region between a pair of guide projections 25 forms an insertion groove 24, and a plate-shaped binding bar 4 can be disposed in the insertion groove 24. A configuration having separator 2 insertion grooves 24 with binding bars 4 fit in those insertion grooves 24 links the binding bars 4 and separators 2 in an interlocking manner that restricts up-and-down movement between the binding bars 4 and separators 2. This prevents up-and-down vibration of the separators 2 with respect to the binding bars 4, and by virtue of the separators 3 also prevents up-and-down vibration of the rectangular battery cells 1.

A connecting structure that fits binding bars 4 into insertion grooves 24 established on both sides of the separators 2 can prevent up-and-down movement between the binding bars 4 and separators 2. However, the interlocking binding bar 4 and separator 2 structure of the battery array of the present invention is not limited to the configuration described above. Binding bars 4 and separators 2 can be linked by any structure that fits the binding bars 4 and separators 2 together to limit their relative up-and-down movement. For example, although not illustrated, through-holes can be provided in the binding bars, corresponding projections that insert into the through-holes can be provided on the separators, and the binding bars and separators can be linked in an interlocking structure that limits their up-and-down movement by inserting the projections in the through-holes. Or, linking projections that protrude toward the separators can be provided on the binding bars, linking recesses that accept the linking projections can be provided on the sides of the separators, and the binding bars and separators can be linked in an interlocking structure that limits their up-and-down movement by inserting the linking projections in the linking recesses.

[Endplates 3]

Endplates 3 are disposed at both ends of a battery stack 5, which has rectangular battery cells 1 stacked alternately with separators 2. A pair of endplates 3 holds the battery stack 5 together. Each endplate 3 in FIG. 5 is configured with an endplate body 31 made from molded plastic stacked inside a metal plate 32 made from a metal such as aluminum. However, endplates can also be made entirely of metal or entirely of plastic. Each endplate 3 is provided with four screw-holes 33 where set-screws 35 are screwed-in to attach the binding bars 4 at the corners of the endplate 3 outer surface. Further, each endplate 3 in the figure has insertion grooves 34 established on both sides of the top of the endplate body 31, and those insertion grooves 34 mate with binding bar 4 horizontal sections 42 to hold the binding bars 4 in fixed positions. However, as shown in FIG. 9, each endplate 3 can also have guide projections 36 established on both sides of the top the endplate body 31 in positions above and below the binding bars 4, and the plate-shaped binding bars 4 can be inserted in the insertion grooves 34 formed between the pairs of guide projections 36.

In this manner, the rectangular battery cell 1 and separator 2 stack is sandwiched from both ends between endplates 3 by securing the side surfaces with binding bars 4. The binding bars 4 are attached to the endplates 3 by screwing set-screws 35 into the endplate 3 screw-holes 33.

[Binding Bars 4]

As shown in FIGS. 4, 5, 8, and 9, the binding bars 4 hold the battery stack 5 together from both sides. The binding bars 4 extend in the battery cell 1 stacking direction and are metal-plates of given width disposed along the battery stack 5 surfaces. The battery arrays of the figures are held together by two binding bars 4 positioned at the top and bottom of each side of the battery stack 5. The battery stack 5 is bound together from both sides by a total of four binding bars 4. The ends of the binding bars 4 are bent at approximately right angles to form bent regions 43 that align with the outer surfaces of the endplates 3. Through-holes 44 are established through the bent regions 43. Set-screws 35 passed through the through-holes 44 are screwed into the endplates 3 to attach the binding bars 4 to the endplates 3.

Further, binding bars 4 shown in FIGS. 4, 5, and 7 are formed with an L-shaped cross-section and provided with a vertical section 41 that extends along the sides of the battery stack 5 and a horizontal section 42 that fits in the separator insertion grooves 24. The horizontal sections 42 of the binding bars 4 are established in positions that fit into the insertion grooves 24 in the separators 2. In the battery array of the figures, horizontal sections 42 are provided on the upper binding bars 4 and those horizontal sections 42 are inserted in the separator 2 insertion grooves 24. The binding bar 4 horizontal sections 42 are inserted in the insertion grooves 24 in the projecting pieces 23 that are disposed on the upper surfaces of the rectangular battery cells 1. Accordingly, the horizontal sections 42 are disposed on the upper surfaces of the rectangular battery cells 1 in a manner insulated by the separators 2. Since the horizontal sections 42 of the binding bars 4 protrude inward towards the center-line of the battery stack 5, they can be made laterally wide and strong without increasing the outline of the battery stack 5.

In the battery array of FIGS. 4 and 5, only the upper binding bars 4 have L-shaped cross-sections. This configuration can restrain relative movement between the binding bars 4 and separators 2 without increasing the vertical height of the battery array. This is because the projecting pieces 23 that hold the binding bars 4 can be disposed below the electrode terminals 14 at both ends of the tops of the rectangular battery cells 1.

However, the battery array can also be configured with both upper and lower binding bars having L-shaped cross-sections, projecting pieces having insertion grooves established at both the tops and bottoms of the separators, and both the upper and lower binding bar horizontal sections inserted in projecting piece insertion grooves at the tops and bottoms of the separators. Further, the battery array can also be configured with only the lower binding bars having L-shaped cross-sections, and binding bar horizontal sections inserted only in projecting piece insertion grooves established at the bottoms of the separators.

In the battery array of FIGS. 8 and 9, binding bars 4 have a flat metal-plate structure. These binding bars 4 align with insertion grooves 24 established between pairs of guide projections 25 established on both sides of the separators 2. Binding bars 4 are linked with the separators 2 by being fit inside the insertion grooves 24.

Figure 10:
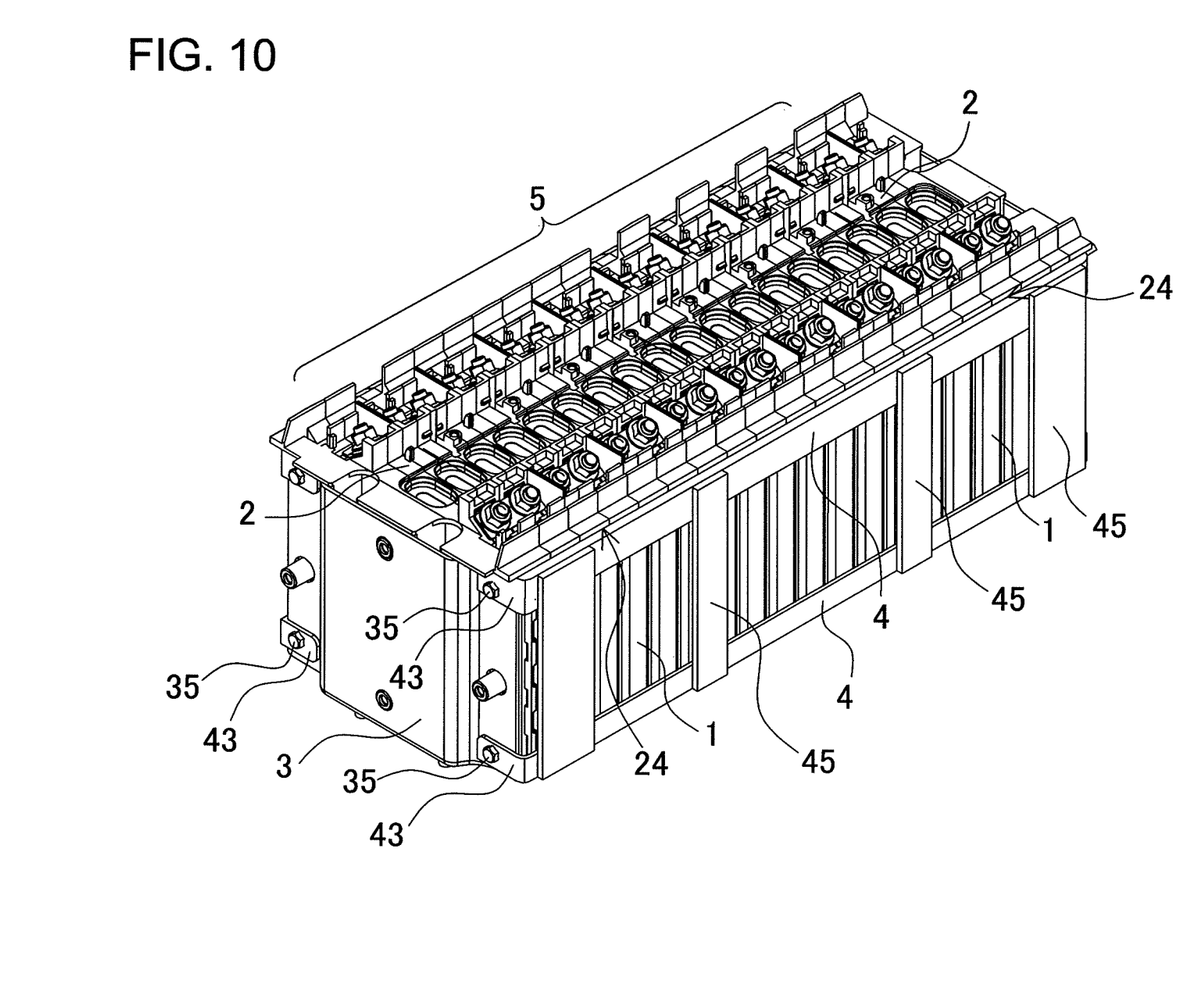
FIG. 10 is a perspective view of a battery array for another embodiment of the present invention.
Figure 11:
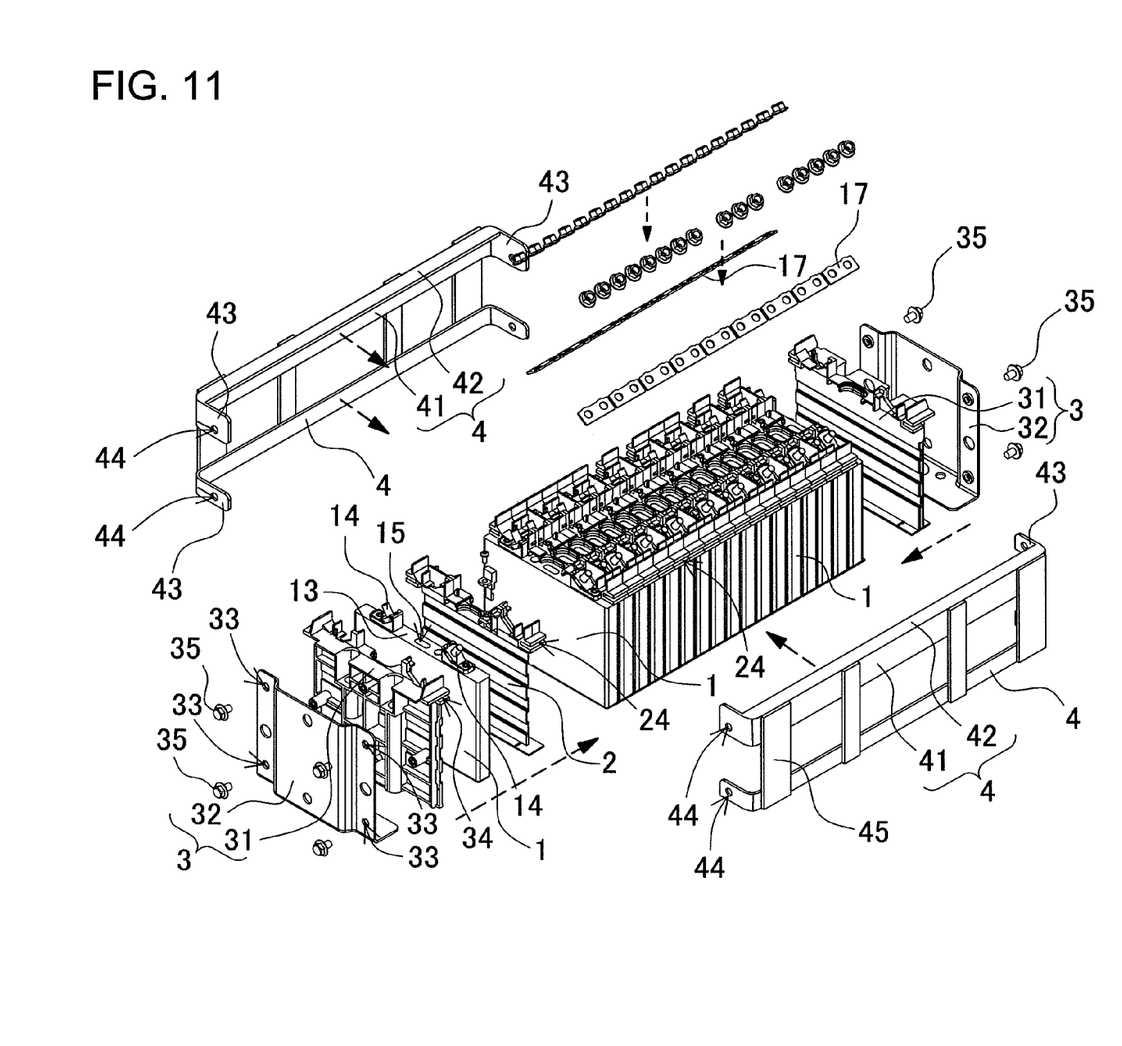
FIG. 11 is an exploded perspective view of the battery array shown in FIG. 10.

In the battery array of FIGS. 10 and 11, reinforcing plates 45 connect the upper and lower binding bars 4. The battery array of the figures has a plurality of reinforcing plates 45 connecting the upper and lower binding bars 4. The reinforcing plates 45 are metal-plates disposed along the sides of the battery stack 5 with upper and lower ends attached to the binding bars 4 by an attachment method such as welding. The binding bars 4 of this battery array have a stronger structure that can bind the battery stack 5 together more robustly in a manner that does not vibrate.

[Power Source Apparatus in a Power Storage Application]

Figure 12:
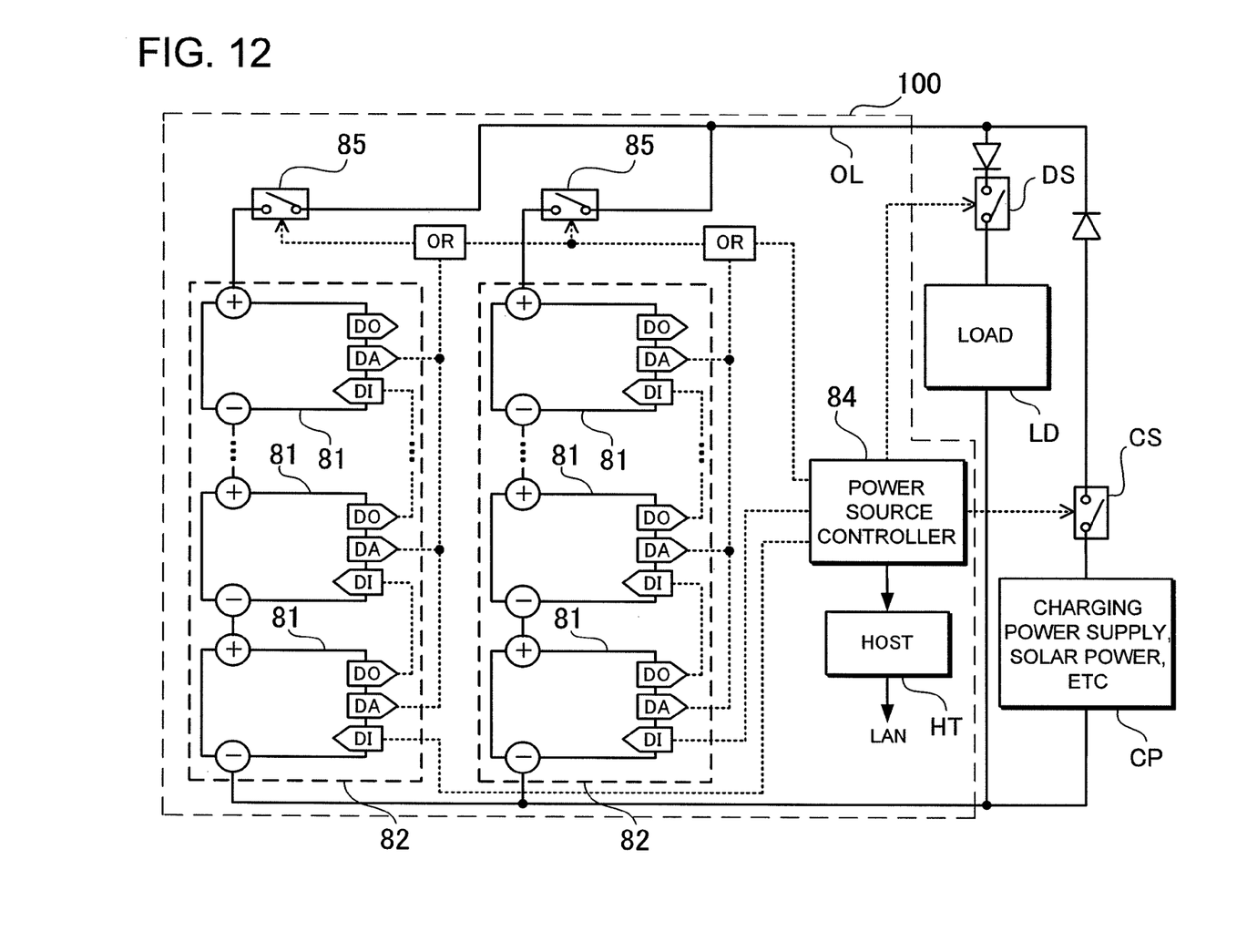
FIG. 12 is a block diagram showing an example of a power source apparatus used in a power storage application.

The power source apparatus can be used not only as the power source in motor vehicle applications, but also as an on-board (mobile) power storage resource. For example, it can be used as a power source system in the home or manufacturing facility that is charged by solar power or late-night (reduced-rate) power and discharged as required. It can also be used for applications such as a streetlight power source that is charged during the day by solar power and discharged at night, or as a backup power source to operate traffic signals during power outage. An example of a power source apparatus for these types of applications is shown in FIG. 12. The power source apparatus 100 shown in this figure has a plurality of battery packs 81 connected to form battery units 82. Each battery pack 81 has a plurality of battery cells connected in series and/or parallel. Each battery pack 81 is controlled by a power source controller 84. After charging the battery units 82 with a charging power supply CP, the power source apparatus 100 drives a load LD. Accordingly, the power source apparatus 100 has a charging mode and a discharging mode. The load LD and the charging power supply CP are connected to the power source apparatus 100 through a discharge switch DS and a charging switch CS respectively. The discharge switch DS and the charging switch CS are controlled ON and OFF by the power source apparatus 100 power source controller 84. In the charging mode, the power source controller 84 switches the charging switch CS ON and the discharge switch DS OFF to allow the power source apparatus 100 to be charged from the charging power supply CP. When charging is completed by fully-charging the batteries or by charging to a battery capacity at or above a given capacity, the power source apparatus can be switched to the discharging mode depending on demand by the load LD. In the discharging mode, the power source controller 84 switches the charging switch CS OFF and the discharge switch DS ON to allow discharge from the power source apparatus 100 to the load LD. Further, depending on requirements, both the charging switch CS and the discharge switch DS can be turned ON to allow power to be simultaneously supplied to the load LD while charging the power source apparatus 100.

The load LD driven by the power source apparatus 100 is connected through the discharge switch DS. In the discharging mode, the power source controller 84 switches the discharge switch DS ON to connect and drive the load LD with power from the power source apparatus 100. A switching device such as a field effect transistor (FET) can be used as the discharge switch DS. The discharge switch DS is controlled ON and OFF by the power source apparatus 100 power source controller 84. In addition, the power source controller 84 is provided with a communication interface to communicate with externally connected equipment. In the example of FIG. 12, the power source controller 84 is connected to an external host computer HT and communicates via known protocols such as universal asynchronous receiver transmitter (UART) and recommended standard-232 (RS-232C) protocols. Further, depending on requirements, a user interface can also be provided to allow direct user operation. Each battery pack 81 is provided with signal terminals and power terminals. The signal terminals include a battery pack input-output terminal DI, a battery pack error output terminal DA, and a battery pack connecting terminal DO. The battery pack input-output terminal DI allows output and input of signals to and from the power source controller 84 and other battery packs. The battery pack connecting terminal DO allows output and input of signals to and from another related battery pack. The battery pack error output terminal DA serves to output battery pack abnormalities to components and devices outside the battery pack. In addition, the power terminals allow the battery packs 81 to be connected in series or parallel. The battery units 82 are connected in parallel to the output line OL via parallel connecting switches 85. It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2010-150568 filed in Japan on Jun. 30, 2010 the content of which is incorporated herein by reference.

What is claimed is:

1. A battery array comprising:
   a battery stack having a plurality of rectangular battery cells stacked together with intervening separators;
   a first endplate disposed at a first end of the battery stack;
   a second endplate disposed at a second end of the battery stack; and
   a binding bar extending in the battery cell stacking direction and attached to the endplates to bind the battery stack,
   wherein each of the separators has an insertion groove recessed inwardly towards a center of the battery stack from a side surface of the battery stack, the insertion grooves being aligned in a line extending along the stacking direction of the rectangular battery cells,
   wherein the binding bar has a vertical section facing the side surface of the battery stack and a horizontal section fitting in the insertion grooves of the separators, and
   wherein the horizontal section and insertion grooves of the separators fit together in a linked configuration that limits their relative movement in a direction which is vertical relative to the horizontal section.

2. The battery array as cited in claim 1, wherein the insertion grooves of the separators are disposed between electrode terminals of the rectangular battery cells and upper surfaces of the rectangular battery cells.

3. The battery array as cited in claim 1, wherein the separators have the insertion grooves at the top or bottom on both sides of the battery stack.

4. The battery array as cited in claim 1, further comprising a second binding bar disposed at the bottom of the battery stack.

5. The battery array as cited in claim 4 wherein reinforcing plates connect mid-regions of the upper and lower binding bars.

6. The battery array as cited in claim 1 wherein each rectangular battery cell is provided with a metal external case, and the surface of the metal external case is covered with an insulating layer.

7. The battery array as cited in claim 1 wherein the tops and bottoms of the separators have projecting pieces that fit rectangular battery cells inside, and the rectangular battery cells are disposed inside the upper and lower projecting pieces.

8. The battery array as cited in claim 7 wherein projecting pieces are positioned along the top and bottom surfaces of the rectangular battery cells and sandwich the rectangular battery cells from above and below to hold them in fixed positions.

9. The battery array as cited in claim 3 wherein the tops and bottoms of the separators have projecting pieces that fit the rectangular battery cells inside, the rectangular battery cells are disposed inside the upper and lower projecting pieces, and the insertion grooves that mate with the binding bar are formed by the projecting pieces.

10. The battery array as cited in claim 1 wherein the separators form cooling gaps between adjacent rectangular battery cells.

11. The battery array as cited in claim 1 wherein each of the rectangular batteries comprises a unit cell that is either a lithium ion battery, nickel hydride battery, or nickel cadmium battery.

12. The battery array as cited in claim 1 wherein the separators are made of plastic and insulate adjacent rectangular battery cells.

13. The battery array as cited in claim 4, wherein the binding bars are connected by a plurality of reinforcing plates.

* * * * *